Feb. 18, 1936.  E. B. MOULLIN  2,031,224
THERMIONIC OSCILLATION GENERATOR
Filed Nov. 17, 1933

INVENTOR
ERIC B. MOULLIN
BY
ATTORNEY

Patented Feb. 18, 1936

2,031,224

UNITED STATES PATENT OFFICE 2,031,224

THERMIONIC OSCILLATION GENERATOR

Eric Balliol Moullin, Oxford, England, assignor to Radio Corporation of America, a corporation of Delaware Application November 17, 1933, Serial No. 698,459
In Great Britain February 28, 1933

7 Claims. (Cl. 250—36)

This invention relates to thermionic oscillation generators, and has for its object to provide a thermionic oscillation generator of improved frequency stability, and whose frequency shall be only to a small extent dependent upon temperature.

It can be shown that the frequency generated by a back coupled thermionic oscillation generator depends to a slight extent upon the relative phases of the grid and anode potentials, and if the frequency generated is to be constant it is essential that these potentials be substantially in anti-phase with one another.

The present invention consists broadly in the provision of means for causing the aforesaid grid and anode potentials to be substantially in exact anti-phase, or in the case where two valves are employed for causing the combined anode current of said two valves to be substantially exactly in phase with the common anode potential for said valves, and in carrying out the invention a resonant network tuned to the frequency to be generated is connected in the anode circuit of the valve or valves and a plurality of potentials differing in phase from the alternating anode potential by predetermined amounts is derived from said network and said plurality of potentials is fed back to the grid or grids of the valve or valves in the correct relative proportions to produce the desired phase relationship above set forth.

In a preferred arrangement the resonant network comprises two branches one of which is overall inductively reactive and the other of which is overall capacitatively reactive and means are provided for adjusting the power factor in one or both of these branches and a potential derived from each branch is fed back to the input circuit of the generator. In the case where a single valve is employed, these two potentials are combined and fed back to the grid of said valve. In a modification, two valves are employed and one of the derived potentials is fed back to the grid of each valve, the anodes and cathodes of the valves being connected together.

Figure 1:
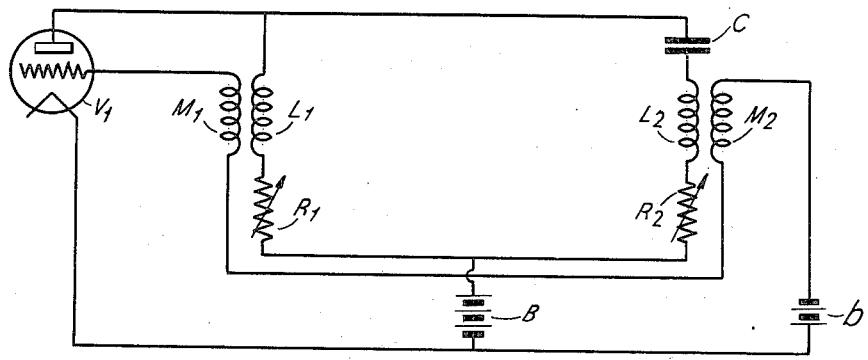
Figure 2:
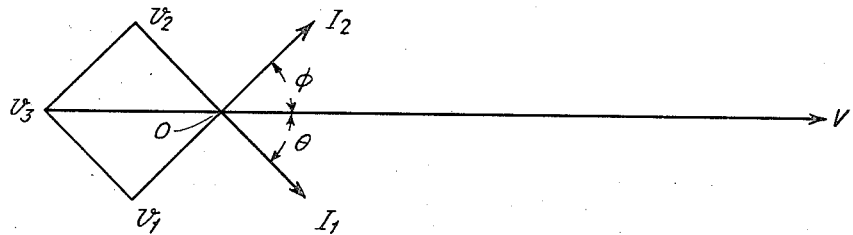
Figure 3:
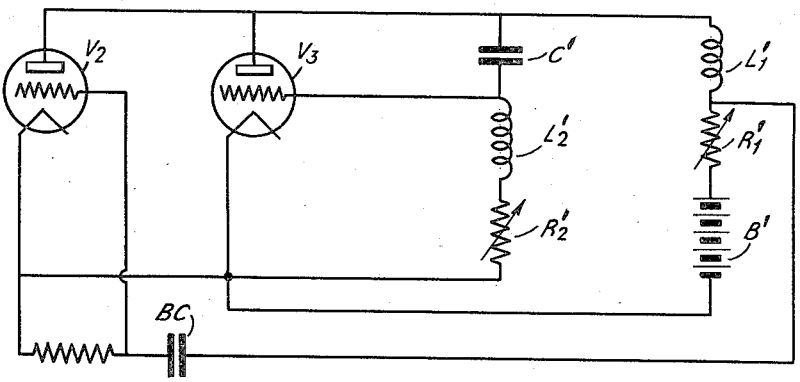

The invention is illustrated in the accompanying drawing, wherein Figure 1 is a schematic representation of a single valve generator in accordance with the invention, Figure 2 is a vector diagram illustrating the operation of the arrangement shown in Figure 1, and Figure 3 shows schematically the circuit arrangement of a generator in accordance with the invention and employing a pair of thermionic valves.

Referring to Figure 1, a triode valve V1 includes in its anode circuit a network consisting of two paths in parallel, one path consisting of an inductance L1 in series with a resistance R1, while the other path consists of a condenser C in series with an inductance L2 in series with a resistance R2, the whole network constituting a tuned circuit damped to a certain extent by the resistance. Anode potential is supplied by means of a battery B. The two paths of the network must be adjusted so that the power factor presented by each path is the same, (this adjustment may be effected, for example, by adding a non-inductive resistance to or adjusting the resistance in one or other path) and the inductances in the two paths are utilized for feeding back voltage to the grid of the valve V1, there being a feed-back coil M1 coupled to the inductance L1 and a second feed-back coil M2 coupled to the inductance L2. The two feed-back coils M1, M2 are in series with one another and with a grid bias battery b and are so coupled to their appropriate inductances that the voltage induced in one from the inductance to which it is coupled is equal to that induced in the other from the inductance to which that is coupled. The two series connected coupling coils are connected in series between the grid and cathode of the triode.

With this arrangement adjusted as stated, i. e., so that each path in the anode circuit is of the same power factor and each coupling coil has the same voltage induced therein, the grid voltage will be exactly in anti-phase with the anode voltage.

This action will be better understood upon reference to Figure 2 wherein OV is a vector representing the alternating component of anode potential; OI1 represents the current (lagging with respect to OV by an angle $\theta$) in the branch containing the inductance L1 and OI2 represents the current (leading with respect to OV by an angle $\phi$) in the branch containing the inductance L2 and the condenser C. If the resistance in one or both of these branches be adjusted till the power factor in each branch is the same, $\theta$ and $\phi$ will be equal. Now the voltage induced in the coil M1 will be represented by a vector $v1$ and that induced in the coil M2 by $v2$ and if these voltages are made equal it will be seen that since $\theta=\phi$ the resultant voltage $v3$ fed back to the grid will be in exact anti-phase with OV.

Referring now to Figure 3, which shows a modification of the above described arrangement, two triodes V2, V3, having their anodes connected together and also their cathodes connected together are employed; the common anode point is connected to the common cathode point through an inductance $L'_1$ in series with a resistance $R'_1$ and an anode battery $B'$ and also through another path consisting of a condenser $C'$ in series with an inductance $L'_2$ in series with a resistance $R'_2$.

The junction point of the condenser $C'$ and the inductance $L'_2$ is connected as shown to the grid of valve $V_3$ and the junction point of the inductance $L'_1$ and the resistance $R'_1$ is connected through a blocking condenser BC to the grid of the valve $V_2$.

By suitably choosing the value of the resistance $R'_1$ with respect to the parameters of the valve $V_2$ the sum of the anode currents of the two valves can be made exactly in phase with the anode potential, and when this condition is satisfied the "coupling effect" will be neutralized and the frequency generated will not be to any substantial extent sensitive to changes of resistance in the grid coil. Due to the resistance of the inductance between the grid and cathode of the first valve, this valve will have a small component of anode current in phase quadrature with the anode potential, while owing to the manner in which the second valve is coupled, its anode current will contain a component in phase quadrature with a common anode potential and in anti-phase with the said quadrature component in the first valve anode current. These two quadrature components are caused to neutralize one another so that the sum of the anode currents will be precisely in phase with the common anode potential and therefore the frequency generated will be that natural to the same network if it were devoid of resistance.

Having now particularly described and ascertained the nature of my said invention and in what manner the same is to be performed, I declare that what I claim is:

1. An electron discharge device oscillation generator comprising a transmitting valve having an input and an output circuit, a resonant network in the output circuit of said valve comprising two parallel branches so adjusted that the power factor of the alternating energy in each of said branches is the same, one of said branches being overall inductively reactive and the other being overall capacitively reactive at the resonant frequency, means for deriving equal potentials from each of said reactive branches and for vectorially adding said derived potentials to produce a resultant potential which is fed back to the input of said valve.

2. An electron discharge device oscillation generator comprising a tube having input and output circuits, a source of potential for the anode of said tube, a resonant network in circuit with said output, two feed-back paths from said network to said input, each path producing a phase of feed-back suitable for oscillation production, both of said feed-backs differing in phase from exact opposition to the anode potential but in opposite senses, and means for vectorially adding said feed-backs to produce a resultant feed-back of greater magnitude than either feed-back alone but of phase which is in exact opposition to said anode potential.

3. An electron discharge device oscillation generator comprising a valve, a resonant network in the output circuit of said valve comprising two parallel branches, one of which consists of an inductance and a resistance in series, and the other of which consists of a capacity in series with an inductance in series with a resistance, means for adjusting the value of the resistance in said branches for equalizing the power factor of the energy in said branches, and means for deriving feed-back potentials of equal amplitude from each of said branches and for vectorially adding same to produce the resultant feed back potential.

4. An oscillation generation system as defined in claim 3, characterized in this, that said means for deriving feed-back potentials includes a feed-back coil coupled to the inductance in each of the two branches, said feed-back coils being connected in series and in circuit with the input of said valve.

5. An electron discharge device oscillation generator comprising a pair of valves each having a grid, anode, and cathode, a resonant network including two parallel branches one of which consists of an inductance in series with a resistance and the other of which consists of a capacity in series with an inductance in series with a resistance, a connection between the junction point of the inductance and resistance of said first mentioned branch and the grid of one of said valves, a connection between the junction point of the capacity and the inductance of said second mentioned branch and the grid of the other valve, a circuit coupling said anodes together and to one junction of the two parallel branches, and a circuit coupling said cathodes together and to the other junction of said two parallel branches, a common source of potential for said anodes, and means for adjusting the resistance in one of said branches whereby the combined anode current of said valves is brought substantially into phase with the common anode potential.

6. In an electron discharge device generator wherein feed-back voltage is desired to be exactly opposite in phase to anode voltage, means for generating a feed-back voltage which leads the desired phase by an appreciable amount, means for generating a feed-back voltage which lags the desired phase by an appreciable amount, and means for combining said two voltages to produce resulting feed-back of phase in exact opposition to the anode voltage.

7. An electron discharge device generator wherein feed-back voltage is desired to be exactly opposite in phase to the anode voltage, comprising a plurality of valves whose anodes and cathodes are respectively connected together, each of said valves having a grid, a common output circuit including a source of voltage connected to the anodes of said valves, a resonant network in the common output of said two valves, means for deriving from said network two potentials, one leading the desired phase of feed-back by a substantial amount less than 90° and the other lagging the desired phase of feed-back by a substantial amount less than 90°, and means for feeding said derived voltages each to the grid of one of said valves whereby the combined alternating anode current of said valves is maintained substantially in exact phase with the common anode voltage thereof.

E. B. MOULLIN.